United States Patent
Kami

(10) Patent No.: US 9,104,494 B2
(45) Date of Patent: Aug. 11, 2015

(54) VIRTUAL COMPUTER SYSTEM AND ITS OPTIMIZATION METHOD

(75) Inventor: Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1174 days.

(21) Appl. No.: 12/595,340

(22) PCT Filed: Mar. 27, 2008

(86) PCT No.: PCT/JP2008/055914
§ 371 (c)(1),
(2), (4) Date: Oct. 9, 2009

(87) PCT Pub. No.: WO2008/132924
PCT Pub. Date: Nov. 6, 2008

(65) Prior Publication Data
US 2010/0131957 A1    May 27, 2010

(30) Foreign Application Priority Data
Apr. 13, 2007  (JP) ................................ 2007-105762

(51) Int. Cl.
*G06F 9/46* (2006.01)
*G06F 9/50* (2006.01)

(52) U.S. Cl.
CPC .................................... *G06F 9/5077* (2013.01)

(58) Field of Classification Search
None
See application file for complete search history.

(56) References Cited

U.S. PATENT DOCUMENTS 7,296,269 B2 * 11/2007 Lin ................................ 718/105
7,477,073 B1 * 1/2009 Tuan et al. ...................... 326/41

(Continued)

FOREIGN PATENT DOCUMENTS

JP  64-2145 A   1/1989
JP  5-346910 A  12/1993

(Continued)

OTHER PUBLICATIONS

International Search Report for PCT/JP2008/055914 mailed Jun. 17, 2008.

(Continued)

*Primary Examiner* — Gregory A Kessler
(74) *Attorney, Agent, or Firm* — Sughrue Mion, PLLC

(57) ABSTRACT

Optimization of resource allocation in a virtual computer system is efficiently performed according to a method consistent with a virtualization design concept. The virtual computer system includes a plurality of virtual devices that share the physical resources of a computer and execute an application, a virtualization section that manages the plurality of virtual devices, and a management section that controls the virtualization section. The plurality of virtual devices set allocation of physical resources to the applications by a first optimization calculation using resource supply information from the management section and transmit resource request information corresponding to the resource allocation setting to the management section. The management section sets allocation of the physical resources to the virtual devices by a second optimization calculation using the resource request information from the plurality of virtual devices and transmits resource supply information corresponding to the resource allocation setting to the plurality of virtual devices. While the resource supply information and the resource request information are exchanged between the plurality of virtual devices and the management section, the first and second optimization calculations are performed, thereby dynamically allocating the physical resources.

26 Claims, 8 Drawing Sheets

(56) References Cited

U.S. PATENT DOCUMENTS

| | | | |
|---|---|---|---|
| 2003/0037092 A1* | 2/2003 | McCarthy et al. | 709/104 |
| 2005/0097384 A1 | 5/2005 | Uehara et al. | |
| 2006/0168587 A1* | 7/2006 | Aslam-Mir | 718/105 |
| 2007/0067435 A1* | 3/2007 | Landis et al. | 709/224 |
| 2008/0172672 A1* | 7/2008 | Logan et al. | 718/104 |

FOREIGN PATENT DOCUMENTS

| | | | |
|---|---|---|---|
| JP | 2000056992 A | 2/2000 | |
| JP | 2000268012 A | 9/2000 | |
| JP | 2002041304 A | 2/2002 | |
| JP | 2004062911 A | 2/2004 | |
| JP | 2005063066 A | 3/2005 | |
| JP | 2005122640 A | 5/2005 | |
| JP | 2005209203 A | 8/2005 | |
| JP | 2006178969 A | 7/2006 | |
| JP | 2006323872 A | 11/2006 | |

OTHER PUBLICATIONS

P. Barham et al., "Xen and the Art of Virtualization", In Proc. SOSP 2003. Bolton Landing, New York, U.S.A. Oct. 19-22, 2003.

W. Yuan et al., "Design and Evaluation of a Cross-Layer Adaptation Framework for Mobile Multimedia Systems", Proceedings of the SPIE/ACM Multimedia Computing and Networking Conference (MMCN'03), Santa Clara, CA, Jan. 2003, pp. 1-13.

M. Kobayashi, "Know-how Shutoku e Xen • Bunshin no Jutsu!", Linux World, Jun. 1, 2006, vol. 5, No. 6, pp. 102-105.

N. Kami et al., "Multilayer-Cooperative, In-service Reconfiguration in IT/NW Systems", Proceedings of the IEICE General Conference, [CD-ROM], Mar. 7, 2007, p. 66.

H. Yamaki et al., "Market-based Application QoS Control: Implementation Tradeoffs", Transactions of Information Processing Society of Japan, Jan. 1999, vol. 40, No. 1, pp. 142-149.

Japanese Office Action for JP2009-511721 mailed on Jul. 18, 2012.

* cited by examiner

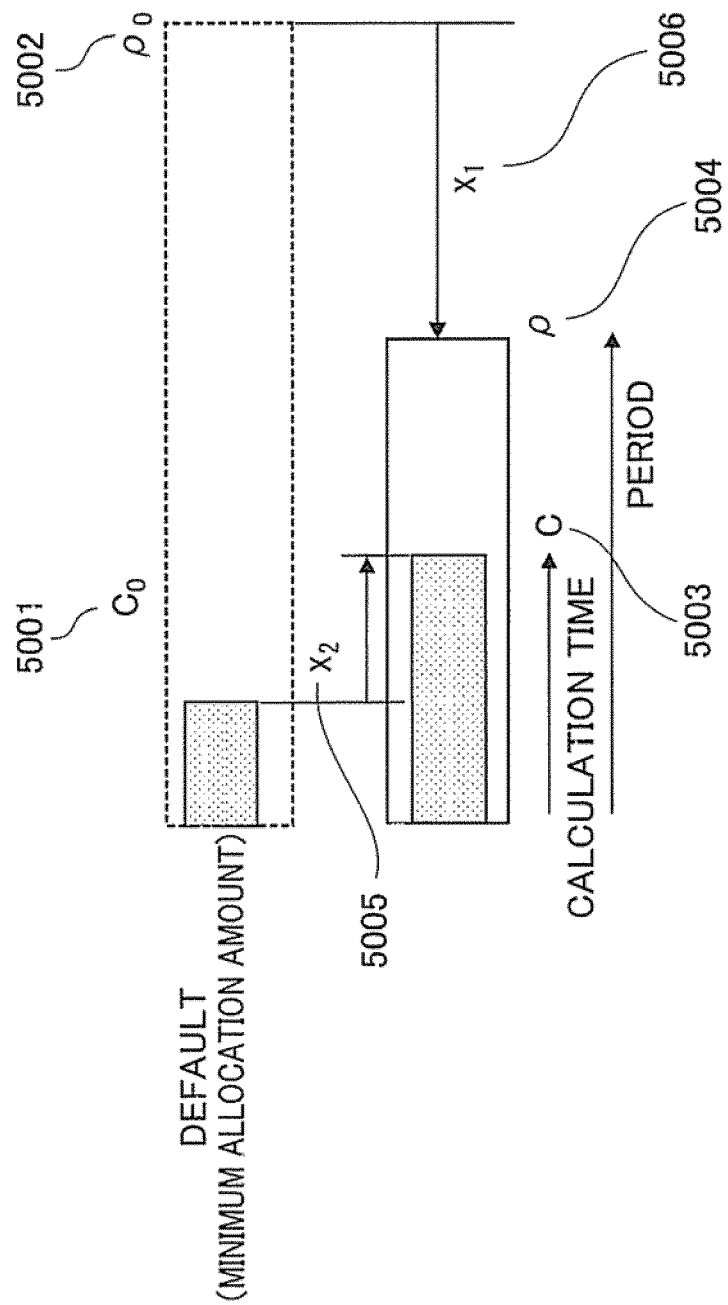

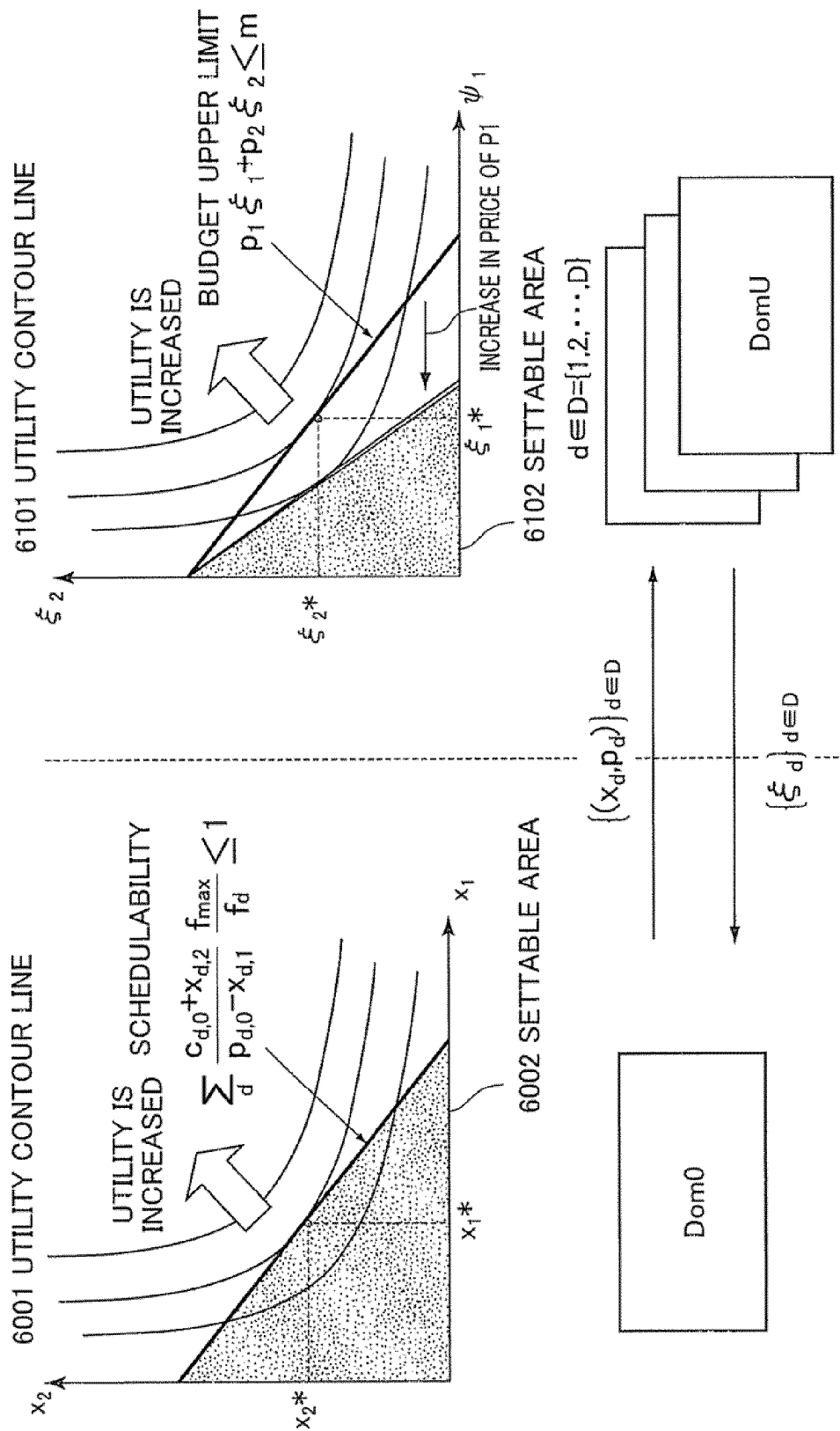

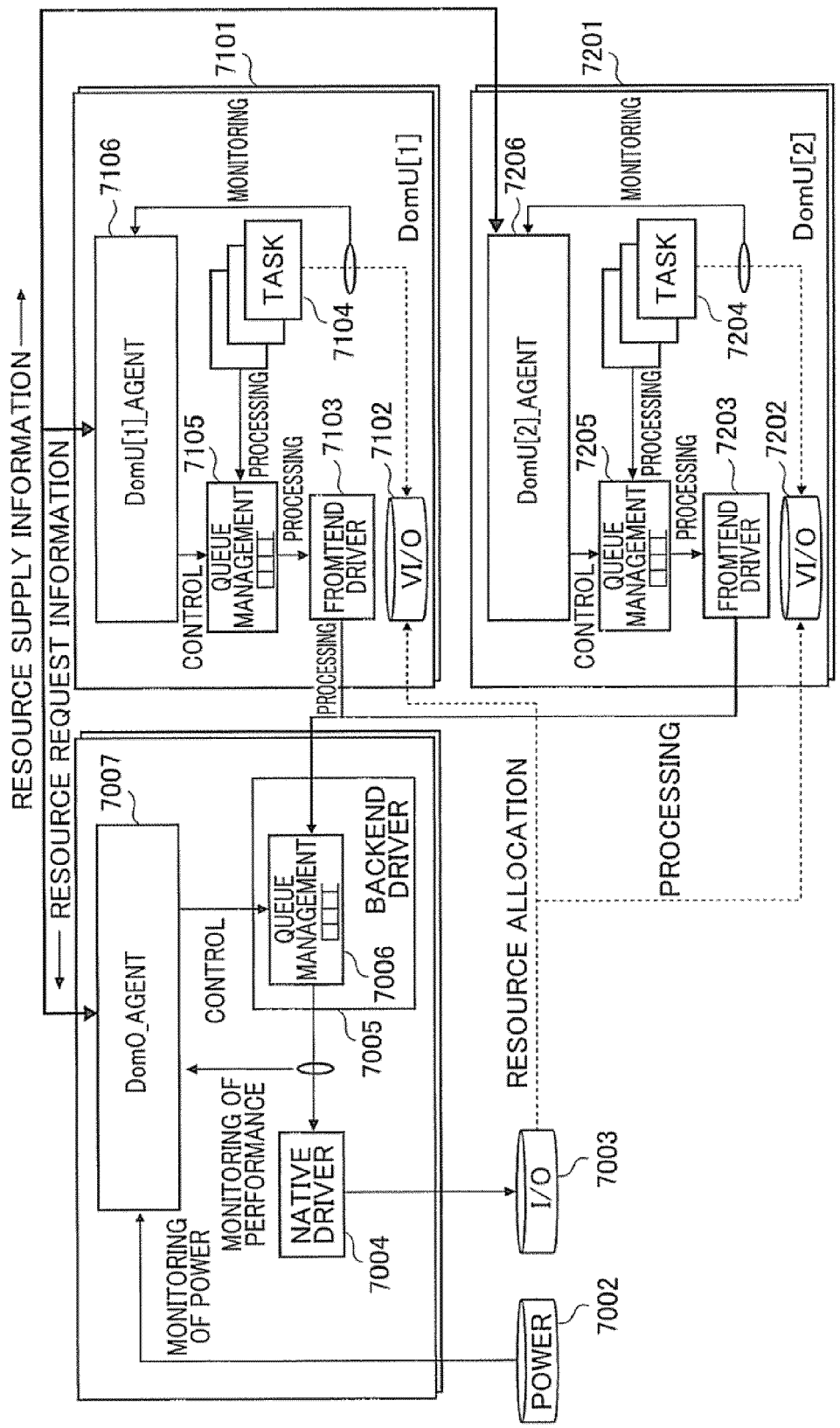

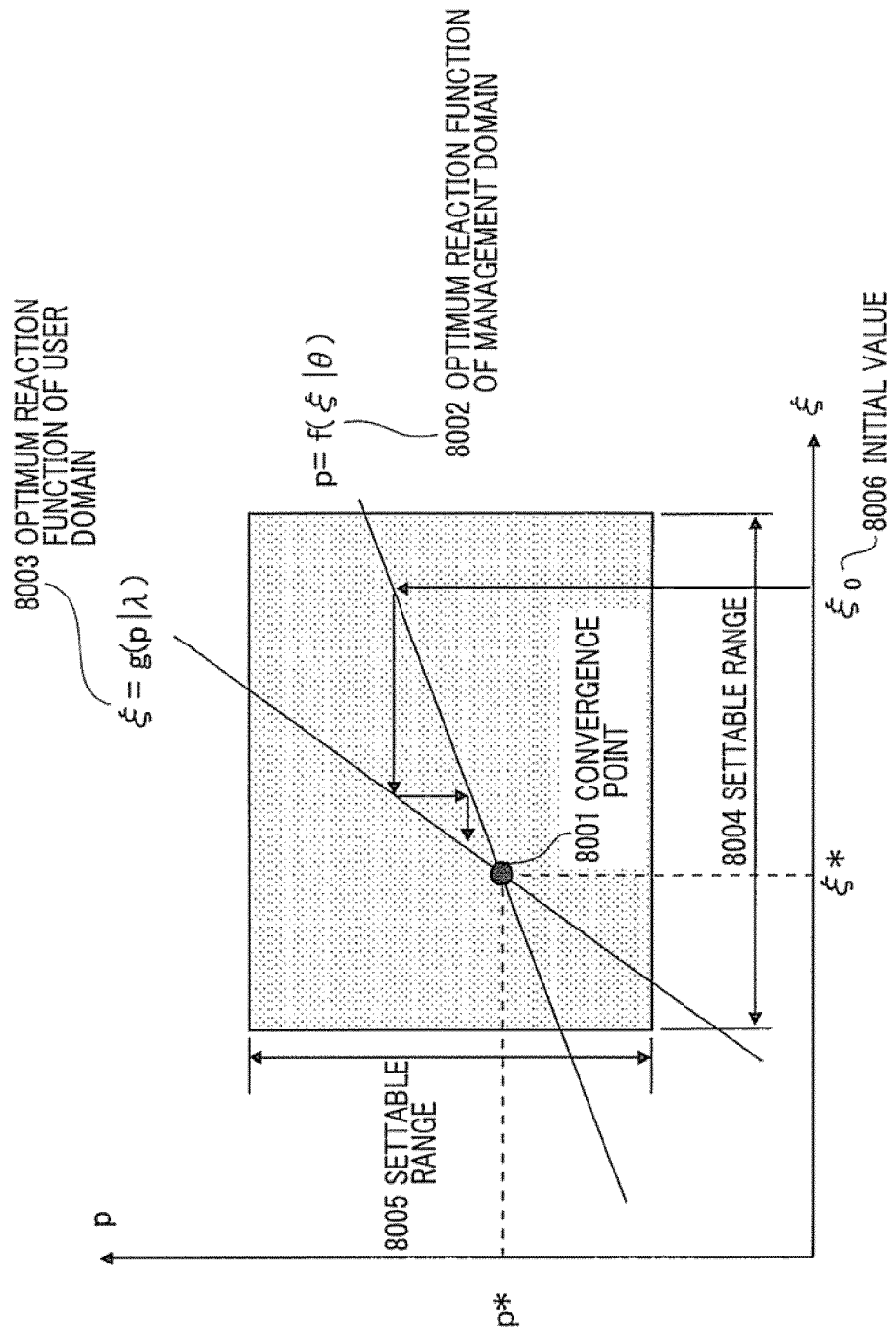

VIRTUAL COMPUTER SYSTEM AND ITS OPTIMIZATION METHOD

TECHNICAL FIELD

The present invention relates to a virtual computer system that shares the physical resources of a computer between a plurality of virtual devices and its optimization method and, more particularly, to a resource allocation optimization technique for maximizing an application level performance index.

BACKGROUND ART

In recent years, a virtual computer system in which a virtualization section called "Virtual Machine Motor (VMM)" is introduced to enable simultaneous operation of a plurality of operating systems (OS) on a single physical server (computer) is utilized in various fields. Each OS is installed onto a physical server, and likewise, the OS is installed onto a virtual server (virtual computer) having a virtual resource, called "Virtual Machine (VM)", respectively. The OS that operates on the VM is called "guest OS". The VMM handles each VM as a software entity, time-division-multiplexes a physical resource, and allocates these time slots to the plurality of VMs, thereby achieving resource sharing between the VMs. The VMM, which has various architectures, is typified by VMware or Xen (refer to, e.g., Non-Patent Document 1).

In a virtualized computer system, a virtualization section provides a virtual resource to each virtual device. The virtual resource is a resource obtained by virtualizing a physical resource such as a central processing unit (CPU), a memory, a disk, or an I/O (Input/Output) device typified by a network interface card (NIC). The guest OS operating on the virtual device operates as if it were operating on the physical resource. Actually, however, the virtualization section schedules a plurality of virtual resources and applies time-division-multiplex to the physical resource so as to allocate the time slots to the guest OS. By changing parameters of the scheduling so as to change allocation of the physical resources, the capacity of the virtual resources allocated to each virtual device can be changed dynamically. In the case of a CPU, taken as a typical resource, parameters concerning time, such as calculation time or period to be allocated or frequency to be allocated to a certain time period (in the case where the frequency is variable) can be changed. Further, in the case of a memory or disk, memory capacity, disk capacity or the like can be taken as the examples of the above parameters. Further, in the case of an NIC, occupied bandwidth can be taken as the examples of the above parameters. In particular, in the case of the disk, throughput or the like can be changed depending on scheduling of a request.

Meanwhile, with regard to a computer system, studies about optimization of resource allocation for maximizing the index of performance or the like have widely been made. As the performance index, QoS (Quality of Service) of an application is often used. The QoS is used as an index associated with, e.g., processing delay or throughput. Optimum resource allocation is performed so that the maximum QoS (e.g., sum of weighting values on the QoS values of all applications) can be obtained across the entire system in a given target time zone. The above resource allocation is performed mainly by an OS in conventional type computer systems, and the OS controls and manages, in a centralized fashion, scheduling of resource allocation to an application and setting change of physical resources, such as a change of CPU frequency or disk rotation speed. The index determined by the application QoS is achieved by control of the physical resources and resource allocation, so that information on a wide range of a plurality of layers including an application layer, an OS layer, and a physical resource layer are provided. A centralized cross-layer management that centralizes these information in the OS layer has been adopted aggressively in a mobile computing whose computational resources are restricted by available battery energy (refer to, e.g., Non-patent Document 2). The above cross-layer management is achieved by the OS, in a privileged position over all the layers, dynamically controlling scheduling parameters or physical resource allocation setting so as to optimize the index. With the above control, the maximum performance can be obtained with the minimum power consumption.

Non-Patent Document 1: P. Barham et al. "Xen and the art of virtualization", In Proc. SOSP 2003. Bolton Landing, New York, U.S.A. Oct. 19-22, 2003

Non-patent Document 2: W. Yuan, et al., "Design and Evaluation of A Cross-layer Adaptation Framework for Mobile Multimedia Systems", Proceedings of the SPIE/ACM Multimedia Computing and Networking Conference (MMCN '03), Santa Clara, Calif., Jan. 2003, 1-13.

SUMMARY OF INVENTION

Technical Problem

While the optimization of resource allocation for maximizing an application level performance index has been practiced in conventional type computer systems, this conventional approach cannot be applied without modification to a virtual computer system. This is because that, in a computer system virtualized by a virtualization section, information of the application layer as the performance index cannot be viewed from the virtualization section capable of controlling the physical resource setting or virtual resource allocation.

A method for making the information of the application layer visible from the virtualization section can be considered in order to solve the above problem. More concretely, the information of the application layer distributed between the respective virtual devices are transferred to the virtualization section through the guest OS, and the virtualization section changes, in a centralized fashion, the resource allocation or physical resource setting, whereby the optimization of resource allocation for maximizing an application level performance index is achieved. However, such a method has the following problems.

The first problem is that the above method goes against the original virtualization design concept, i.e., design concept of a virtualization architecture that encapsulates/modularize resources without obtaining the details of each virtual device.

The second problem is that it is difficult to complete the optimization control within a desired time period. This is because that the time required for the optimization increases exponentially with an increase in the number of applications or types of a resource, so that, in the case where the virtualization section is used to perform the optimization in a centralized fashion, cost involved in the optimization significantly increases, making it very difficult to perform the optimization in which the time resolution is sufficiently fine.

An object of the present invention is to provide a virtual computer system capable of efficiently performing optimization of resource allocation for maximizing an application level performance index according to a method consistent with a virtualization design concept.

Solution to Problem

To achieve the above object, a virtual computer system according to the present invention includes: a plurality of virtual devices that share the physical resources of a computer and execute an application; a virtualization section that manages the plurality of virtual devices; and a management section that controls the virtualization section. The plurality of virtual devices set allocation of physical resources to the applications by a first optimization calculation using resource supply information from the management section and transmit resource request information corresponding to the resource allocation setting to the management section. The management section sets allocation of the physical resources to the virtual devices by a second optimization calculation using the resource request information from the plurality of virtual devices and transmits resource supply information corresponding to the resource allocation setting to the plurality of virtual devices. While the resource supply information and the resource request information are exchanged between the plurality of virtual devices and the management section, the first and second optimization calculations are performed, thereby dynamically allocating the physical resources.

Advantageous Effects of Invention

According to the present invention, it is possible to provide a virtual computer system capable of efficiently performing optimization of resource allocation for maximizing an application level performance index according to a method consistent with a virtualization design concept.

BRIEF DESCRIPTION OF DRAWINGS

FIG. 5 is a view for explaining resources concerning a CPU that exchanges supply/request information between a management domain (Dom0) and a user domain (DomU) in the virtual computer system according to the second example of the present invention.

FIG. 6 is a view for explaining optimization processing in the virtual computer system according to the second example of the present invention.

FIG. 7 is a block diagram showing the entire configuration of a virtual computer system according to a third example of the present invention.

FIG. 8 is a view for explaining the principle under which asymptotical convergence to an optimum setting is achieved by an optimization method used in the virtual computer system according to the first to third examples of the present invention.

EXPLANATION OF REFERENCE SYMBOLS

Figure 1:
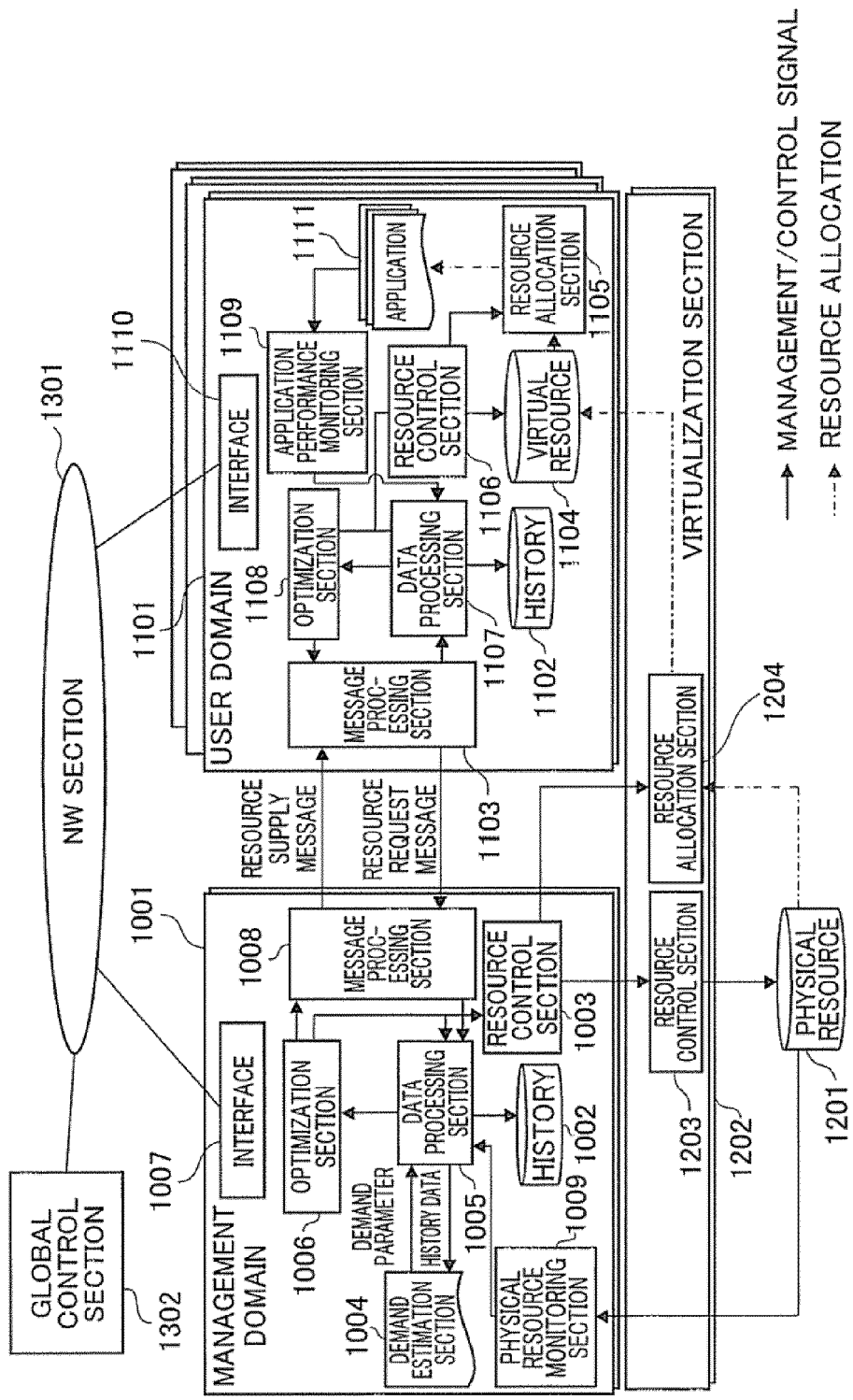
FIG. 1 is a block diagram showing the entire configuration of a virtual computer system according to a first example of the present invention.

1001: Management domain
1002: History
1003: Resource control section
1004: Demand estimation section
1005: Data processing section
1006: Optimization section
1007: Interface
1008: Message processing section
1009: Physical resource monitoring section
1101: User domain
1102: History
1103: Message processing section
1104: Virtual resource
1105: Resource allocation section
1106: Resource control section
1107: Data processing section
1108: Optimization section
1109: Application performance monitoring section
1110: Interface
1111: Application
1201: Physical resource
1202: Virtualization section
1203: Resource control section
1204: resource allocation section
1301: Network (NW) section
1302: Global control section

DESCRIPTION OF EMBODIMENTS

Exemplary embodiments of a virtual computer system and its optimization method according to the present invention will be described in detail below with reference to the accompanying drawings. The term "optimum" used in the present specification section to realize the optimum performance index at the application level by performing fair and efficient resource allocation reflecting a management policy to a maximum extent with minimum possible resources (performance, capacity, power consumption of physical resources).

(First Exemplary Embodiment)

A virtual computer system according to a first exemplary embodiment of the present invention is a virtual computer system in which physical resources of a computer are shared between a plurality of virtual devices and includes a plurality of virtual devices each including an application whose performance is to be managed and a virtualization section that manages the plurality of virtual devices. Each of the virtual devices has a first management section that sets optimum allocation of resources to the applications based on information concerning resource supply notified from the virtualization section, detailed information of the application, and previously set first management policy information and transmitting information concerning the optimum resource request to the virtualization section. The virtual computer system further includes a management section that controls the virtualization section. The management section sets new optimum allocation of resources to the virtual devices based on information concerning resource request from the first management section in each of the plurality of virtual devices, physical resource operating state, a history of information concerning allocation of resources to the virtual devices, and previously set second management policy information and transmits information concerning optimum resource supply to the virtual devices. With the above configuration, dynamic resource allocation realizing desired application performance with minimum possible power consumption and resources at an equilibrium point given by local and distributed optimization performed in the virtualization section and virtual devices and interaction achieved by exchange of the resource supply information and resource request information.

In the present exemplary embodiment, the first management section in each virtual device and second management section that controls the virtualization section perform resource allocation so as to optimize utilities defined in respective section and exchange resource supply and resource request between them to indirectly exert influence to each other's optimization calculation. Thus, it is possible to make a state of the entire system approach a globally optimum state set by considering performance information of all applications while keeping a modularized/encapsulated structure of a virtualized application without using each other's detailed information.

According to the present exemplary embodiment, in a virtual computer system allowing a plurality of virtual devices to run simultaneously on the same physical resource, a distributed approach that does not go against an encapsulated/modularized virtualized architecture allows optimization of application-aware resource allocation. This is because that by distributing processing required for optimum resource allocation between the virtual devices and virtualization section in a manner consistent with a virtualization architecture and exchanging resource supply information and resource request information between the virtual devices and virtualization section to thereby indirectly exert influence to each other, thereby finally making results of the optimization calculations locally performed approach a globally optimum state. Therefore, it is possible for the virtualization section to perform optimum resource allocation in which the current load state of an application is reflected in each virtual device without reference to detailed information of each virtual device.

Further, according to the present exemplary embodiment, in a virtual computer system allowing a plurality of virtual devices to run simultaneously on the same physical resource, optimization of resource allocation can be performed rapidly enough to be able to dynamically follow an environmental change. This is because that by distributing processing required for optimum resource allocation between the virtual devices and virtualization section and exchanging resource supply information and resource request information between the virtual devices and virtualization section to thereby indirectly exert influence to each other, thereby finally making results of the optimization calculations locally performed approach a globally optimum state, and the distributed approach allows reduction of complexity of calculation and reduction of processing time to thereby achieve optimization in which the time resolution is sufficiently fine.

The virtualization section may be a virtual machine monitor, and the plurality of virtual devices each may include virtual resources provided by allocation of the physical resources performed in a time-division multiplex fashion and an operating system and application running on the virtual resources.

The physical resources may be resources typified by a CPU, I/O device, and the like, and the plurality of virtual devices share the physical resources in a time-division multiplex fashion.

The application may be a software program that runs on a computer, and the performance thereof may depend on the resource amount of supplied physical resources and the type thereof.

The second management section that controls the virtualization section may be a computer program that can execute a privileged command such as control for setting physical resources and control for allocating the resources to the virtual devices.

The detailed information of the application may be performance information including a management policy such as load, allocated resource amount, and priority, processing delay, and processing throughput.

The first management section in each of the plurality of virtual devices may be a software program that can perform optimization of resource allocation in each of the virtual device, manage detailed information of the application program therein, and instruct an operating system running thereon to control allocation of the resources to the application program.

The resource supply information may be information concerning use cost and allocation amount of the resources that the virtualization section allocates to each of the virtual devices. The resource use cost may preferably be a quantitative index for calculating cost required for acquisition of resource amount typified by a price.

The first management policy information set in the virtual device may be an index indicating the priority of the application and resource acquisition upper limit set for the virtual device which depends on the priority.

The second management policy information may be statically set information required for optimization of resource allocation and operation of setting the optimized resource allocation, such as the priority of the virtual devices, information concerning the resource use cost, and settable range including the upper and lower limits of the resource allocation amount.

Setting of resource allocation to the application may be realized by an operating system running on each of the virtual devices performing scheduling of resource use allocation of the virtual resources with respect to a process and a thread associated with each application program.

The information concerning resource request, which is request information of virtual resources provided to each virtual device transmitted from the first management section running on the virtual device to second management section for controlling the virtualization section, may be request information concerning the allocation amount of the virtual resources determined based on the optimum resource amount obtained through optimization calculation performed in the virtual device. The information concerning resource request may preferably be represented by a quantitative index typified by a capacity or resource allocation time.

The information concerning a physical resource operating state may be information describing the operating state of the physical resources typified by the current setting information of the physical resources, a control parameter value of a program that controls the physical resources, and a power consumption. The information concerning a physical resource operating state may preferably be information concerning a setting/operating state of the physical resources to be controlled/managed in the virtual computer system, typified by setting frequency and voltage of a CPU, current load factor, voltage, rotating speed, capacity, free space of a disk device, bandwidth of a network interface device, and the like.

The history of information concerning resource allocation to the virtual devices may be histories of resource allocations that have been performed up to the current time point based on the result of the optimization and resource request information from the first management section running on each of the virtual devices corresponding to the resource allocation.

The second management policy information concerning the virtualization section may be statically set information concerning optimization and resource allocation, typified by a cost index with respect to a use of the physical resources, priority of the virtual devices, and a settable range indicating the upper and lower limits of the resources to be allocated to the virtual devices.

The equilibrium point given by local optimization may indicate a state where results of optimization operations in both the second management section that controls the virtualization section and first management section running on each of the virtual devices which are performed while the resource supply information and resource request information are exchanged between the optimization operations fall within a predetermined range.

The reduction in power consumption may preferably be achieved by control of setting parameters of physical resources provided in the virtual computer system.

The second management section that controls the virtualization section and first management section running on each of the virtual devices may continuously repeat the optimization calculation and setting operation, and the management operation may be periodically performed or autonomously performed upon reception of an instruction from an external program or depending on an analysis result of the current management information which constantly changes.

In the case where a physical resource to be controlled is a CPU and where the virtualization section adopts real-time scheduling, the allocation of the physical resources may be performed by changing the period and calculation time of the CPU which are to be allocated to the plurality of virtual devices.

In the case where a physical resource to be controlled is an I/O device, the allocation of the physical resources may be performed by queuing the processing of the I/O device from the plurality of virtual devices and managing the queue.

The optimization performed by the second management section for controlling the virtualization section may be realized by maximizing a quantitative utility function defined by a gain corresponding to the degree of resource request made based on the resource request from the virtual device and cost involved in the resource allocation and realized by determining optimum resource allocation setting, physical resource control, and resource supply information within a settable range which is defined based on the first management policy information.

The optimization performed by the first management section running on each of the virtual devices may be realized by determining setting of resource allocation to the application and information concerning resource request so as to maximize a quantitative utility function determined by performance information of the application within a settable range defined based on the first management policy information.

(Second Exemplary Embodiment)

A method for optimizing a virtual computer system according to a second exemplary embodiment of the present invention is a method for optimizing a virtual computer system including a plurality of virtual devices that share physical resources in a computer and a virtualization section that manages the plurality of virtual devices. This method includes a first step in which a first management section provided in each of the plurality of virtual devices including an application whose performance is to be managed sets optimum allocation of resources to the applications based on information concerning resource supply notified from the virtualization section, detailed information of the application, and previously set first management policy information and transmits information concerning the optimum resource request to the virtualization section, and a second step in which a second management section that controls the virtualization section sets new optimum allocation of resources to the virtual devices based on information concerning resource request from the first management section in each of the plurality of virtual devices, physical resource operating state, a history of information concerning allocation of resources to the virtual devices, and previously set second management policy information and transmits information concerning optimum resource supply to the virtual devices. With the above configuration, dynamic resource allocation realizing desired application performance with minimum possible power consumption and resources at an equilibrium point given by local and distributed optimization performed in the virtualization section and virtual devices and interaction achieved by exchange of the resource supply information and resource request information.

(Third Exemplary Embodiment)

A program according to a third exemplary embodiment of the present invention allows a computer constituting a virtual computer system including a plurality of virtual devices that share physical resources in a computer and a virtualization section that manages the plurality of virtual devices to function as a first management section and a second management section. The first management section runs on each of the plurality of virtual devices including an application whose performance is to be managed, sets optimum allocation of resources to the applications based on information concerning resource supply notified from the virtualization section, detailed information of the application, and previously set first management policy information, and transmits information concerning the optimum resource request to the virtualization section. The second management section sets new optimum allocation of resources to the virtual devices based on information concerning resource request from the first management section in each of the plurality of virtual devices, physical resource operating state, a history of information concerning allocation of resources to the virtual devices, and previously set second management policy information and transmits information concerning optimum resource supply to the virtual devices. With the above configuration, dynamic resource allocation realizing desired application performance with minimum possible power consumption and resources at an equilibrium point given by local and distributed optimization performed in the virtualization section and virtual devices and interaction achieved by exchange of the resource supply information and resource request information.

Examples of the present invention will be described in detail below with reference to the accompanying drawings.

EXAMPLE 1

Referring to FIG. 1, a virtual computer system according to Example 1 of the present invention includes a physical resource 1201, one or more user domains 1101, a virtualization section 1202 that virtualizes the physical resource 1201 and provides the virtualized physical resource 1201 to the user domain 1101 as a virtual resource, a management domain 1001 that mainly has a system management function of controlling control parameters of a resource control section 1203 and a resource allocation section 1204 provided in the virtualization section 1202 and of exchanging messages between itself and the user domain 1101, and a global control section 1302 that is connected to the management domain 1001 and user domain 1101 by a network section 1301 and globally controls the entire system.

The term "domain" mentioned here can be interpreted as e.g., "virtual device". In this case, the user domains 1101 are regarded as individual virtual devices provided to users, and the management domain 1001 is regarded as a virtual device (having management section that controls a virtualization section of the present invention) used for managing the entire system. A resource control section 1003, a demand estimation section 1004, a data processing section 1005, an optimization section 1006, an interface 1007, a message processing section 1008, and a physical resource monitoring section 1009 in the management domain 1001 constitute a management section that controls the virtualization section 1202. A message processing section 1103, a resource allocation section 1105, a resource control section 1106, a data processing section 1107, an optimization section 1108, an application performance monitoring section 1109 and an interface 1110 in the user domain 1101 constitute a management section that manages the virtual device. These management sections are generally realized by a software program. The software program is recorded in a computer-readable recording medium, such as a magnetic disk, loaded into a computer at the start-up time thereof, and controls the operation of the computer, whereby the management sections are realized on the computer.

The management domain 1001 performs optimization and execution of allocation of the capacity and the like of the virtual resource 1104 to be allocated to the user domain 1101 and setting of the physical resource 1201. To this end, the management domain 1001 has a message processing section 1008 that exchanges message of dynamic information concerning resources with the user domain 1101. The message processing section 1008 transmits, to the user domain 1101, cost information required for the user domain 1101 to receive supply of the current resources and receives, from the user domain 1101, demand information indicating how much and which type of resource the user domain 1101 requires. The management domain 1001 further has a history 1002 that stores history information of resource allocation setting information or resource request information received from the user domain 1101 and a data processing section 1005 that manages the history information. The management domain 1001 further has a physical resource monitoring section 1009 that monitors a state of the physical resource 1201 and notifies the data processing section 1005 of the monitored state. The state of the physical resource typically includes, e.g., a power consumption state but not limited thereto. The data processing section 1005 stores necessary information in the history 1002 and manages them as well as uses a demand estimation section 1004 that provides a function of estimating a resource request state of the user domain 1101 to estimate the resource request state of each user domain 1101 and notifies the optimization section 1006 of parameters required for identifying the estimated resource request state. The resource request information is, e.g., a resource demand function with respect to, e.g., resource acquisition cost, application performance state, and the like, but not limited to this.

The optimization section 1006 calculates the current optimum setting based on the information managed by the data processing section 1005, transmits resource supply information to the user domain 1101 through the message processing section 1008, and controls the resource control section 1203 and resource allocation section 1204 in the virtualization section 1202 so as to perform setting for the necessary physical resource 1201 and allocation thereof through the resource control section 1003.

The interface 1007 can receive various commands from the global control section 1302 and transmit information such as data stored in the history 1002 through the network section 1301 and thus provides an interface with an administrator of the entire system.

Each of the user domains 1101 has a message processing section 1103 that exchanges the resource supply information and resource request information with the management domain 1001, an application performance monitoring section 1109 that monitors a performance state of an application 1111 running in the user domain 1101, and a data processing section 1107 that stores the above various information in a history 1102 and manages them. The data processing section 1107 transmits information required for optimizing the user domain 1101 to the optimization section 1108, the optimization section 1108 performs optimization calculation and, based on a result of the calculation, issues a resource request to the management domain 1001, performs setting of the virtual resource 1104, and determines allocation of the virtual resource 1104 to the application 1111. The resource control section 1106 controls the virtual resource 1104 and resource allocation section 1105 according to the setting determined by the optimization section 1108, and message processing section 1103 notifies the management domain 1001 of the resource request information.

The network section 1301 is a network section typified by Ethernet®, and the global control section 1302 is a management software program that runs on a computer resource installed at a remote location.

Viewed from a global standpoint, the "optimization" section obtains desired application performance with minimum possible resources and satisfies both efficiency and fairness. While cross-layer information is required as described above in order to achieve the optimization, indexes and operation required for optimizing the entire system are distributed between the management domain 1001 and user domain 1101 and, based on results of local optimization that have been individually defined in the management domain 1001 and user domain 1101, global optimization is achieved. At this time, the management domain 1001 and user domain 1101 interact with each other while exchanging resource supply/request information and, thereby, optimum resource allocation taking a dynamically varying application load state into consideration is performed while keeping virtualization architecture.

To this end, the management domain 1001 that can manage the physical resource 1201 sets, as an optimization index, an achievement of making the use amount of the physical resource 1201 and allocating more resources to a user domain 1101 which transmits a stronger resource request and performs optimization processing (second optimization calculation) for achieving the optimization index.

Each of the user domain 1101 sets, as an optimization index, an achievement of increasing the performance of the application 111 to a desired level with minimum possible resources and performs optimization processing (first optimization calculation) for achieving the optimization index.

As to the interaction part of the optimization processing performed in the management domain 1001 and user domain 1101, the optimization indexes of the domains 1001 and 1101 are designed as follows. That is, from a quantitative point of view, in the case where the resource request from the user domain 1101 increases (decreases), the management domain 1001 changes the supply information so as to make the user domain 1101 operate such that the resource request therefrom is decreased (increased); at the same time, in the case where the resource supply from the management domain 1001 increases (decreases), the user domain 1101 changes the resource request so as to make the management domain operate such that the resource supply therefrom is decreased (increased), and the optimization processing for achieving the respective indexes are performed in the management domain 1001 and user domain 1101. With this optimization processing, a configuration in which the change occurring on one side cancels the change occurring on the other side can be obtained, thereby achieving system stability. The above configuration can be obtained by setting the cost of resources as the supply information and resource request amount as request information but not limited to this.

Hereinafter, one obtained by quantifying the optimization index is referred to as "utility", and a state (parameter setting, message information) in which the utility is maximized is referred to as the most "desired state" for the management domain 1001 and user domain 1101. A utility function is set so that the desired state can be obtained, and optimization processing is performed using the utility function.

For example, the desired state can be defined as a state where the management domain 1001, which manages the physical resource 1201, allocates/sets the resources among the user domains 1101 in a possibly effective and fair way so as to obtain a desired performance level. The desire state can also be defined as a state where the user domain 1101 increases QoS typified by processing delay of the application 1111 to a desired level with minimum possible resources. As the interaction between the management domain 1001 and user domain 1101, a configuration is adopted in which the management domain 1001 presents a cost index of the current resources to the user domain 1101 and the user domain 1101 presents a resource request capacity level to the management domain 1001, thereby indirectly exerting influence on each other.

Figure 2:
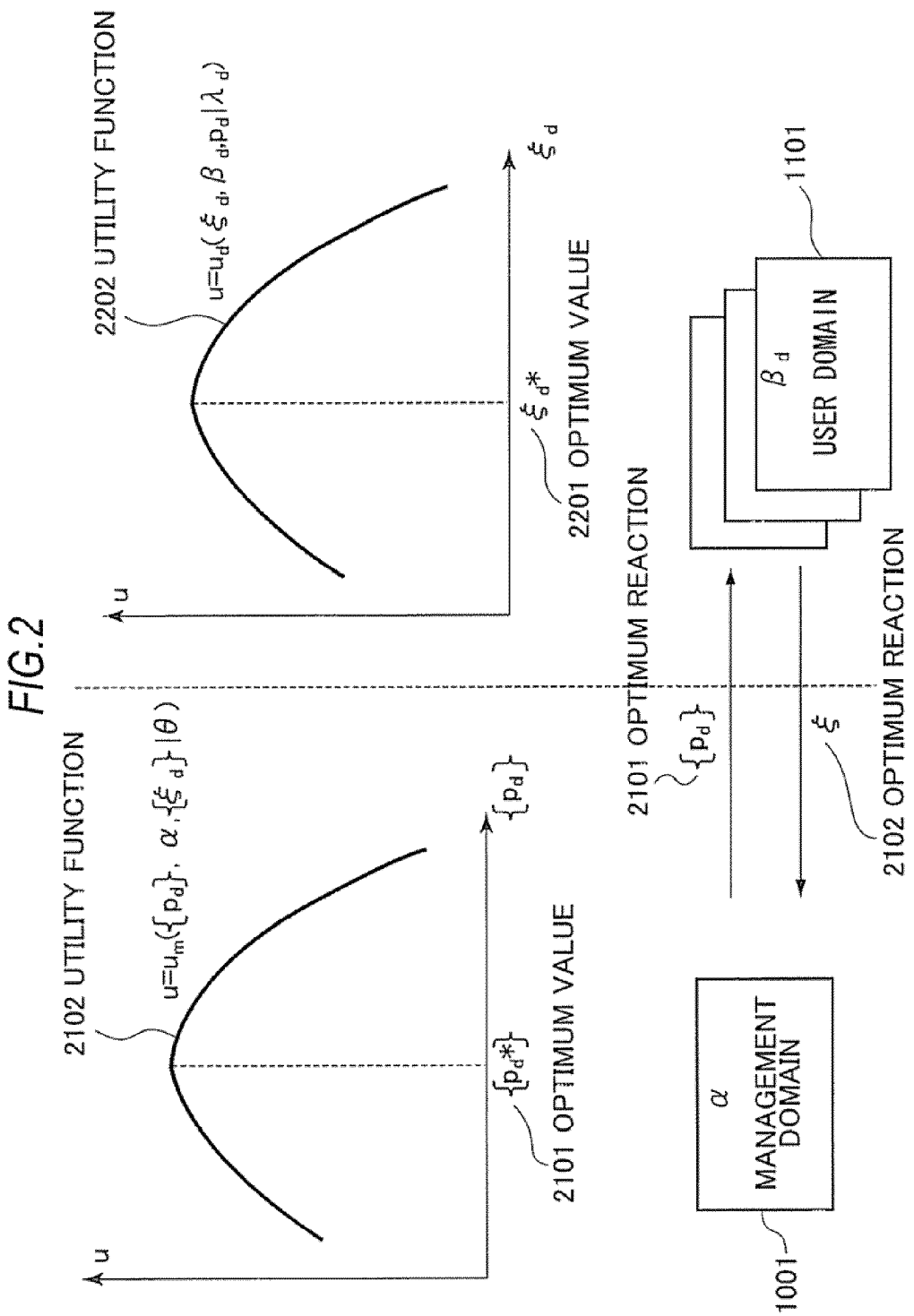
FIG. 2 is a view for explaining optimization processing in the virtual computer system according to the first example of the present invention.

As shown in FIG. 2, the management domain 1001 has a utility function 2102. It is assumed that the larger the value of the utility function 2102, the more desirable the state is. The utility function 2102 is a function of setting parameter $\alpha$, request information $\{\zeta d\} d \in D$, $D=\{1, 2, \ldots, D\}$ (D is the number of domains) from the user domain 1101, and resource supply information $\{pd\}$ to be transmitted to the user domain 1101 with internal state $\theta$ set as a parameter, which is represented by the following equation:

$$u = um(\{pd\}, \alpha, \{\zeta d\} | \theta) \quad (1)$$

The internal state $\theta$ is a set of information required for optimization processing in the management domain 1001 which includes, but not limited thereto, e.g., predefined configuration information (information concerning management policy such as cost coefficient per unit resource, allocation upper limit set for each user domain 1101, or priority among user domains 1101) which is loaded at the start-up time or dynamically variable various monitoring information (breakdown of resources, use state of resources, history of request from the user domain 1101, or history of setting parameters).

Similarly, it is assumed that the a utility function 2202 of the user domain 1101 is a function of setting parameter $\beta d$, resource supply information pd from the management domain 1001, and request information $\zeta d$ to the management domain 1001 with internal state $\lambda d$ set as a parameter, which is represented by the following equation:

$$u = ud(\zeta d, \beta d, pd | \lambda d) \quad (2)$$

As in the case of the management domain 1001, the internal state $\lambda d$ is a set of information required for optimization processing in the user domain 1001 which includes, but not limited thereto, e.g., static information (priority among applications, information concerning management policy such as resource allocation upper limit) which is loaded at the start-up time or dynamic information (current load of application, QoS of application, resource allocation history, resource request history, or supply information history).

The domains 1101 and 1001 search for optimum (maximizing the utility) setting and message information for a given state. It is preferable for the utility functions 2102 and 2202 to have a globally optimum value in a search space. For example, if the utility function has a form of a continuous concave function (function curve has a concave shape as viewed upward in the direction of u-axis), the globally optimum value exists. FIG. 2 intuitively shows the images of the utility functions 2102 and 2202 used in the domains 1101 and 1001.

Referring to FIG. 2, in the management domain 1001, $\{pd^*\} d \in D$ becomes an optimum value for the given $\theta$, $\alpha$, and $\{\zeta d\} d \in D$. $\{\zeta d\} d \in D$ is given from the user domain 1101 and exerts the shape of the utility function, thereby exerting the optimum value $\{pd^*\} d \in D$ or optimum setting $\alpha$. Similarly, a change in the internal state $\theta$ exerts $\{pd^*\} d \in D$ or optimum setting $\alpha$ that gives the utility maximum value. Similarly, in the user domain 1101, the optimum setting $\beta d$ and resource request information $fd$ vary with a variation of $\lambda d$ due to a load variation of an application or a variation of the resource supply information pd from the management domain 1001. The management domain 1001 and user domain 1101 repeat optimum reactions 2101 and 2102 with respect to inputs from each other to interact with each other until a convergence value is obtained.

Figure 3:
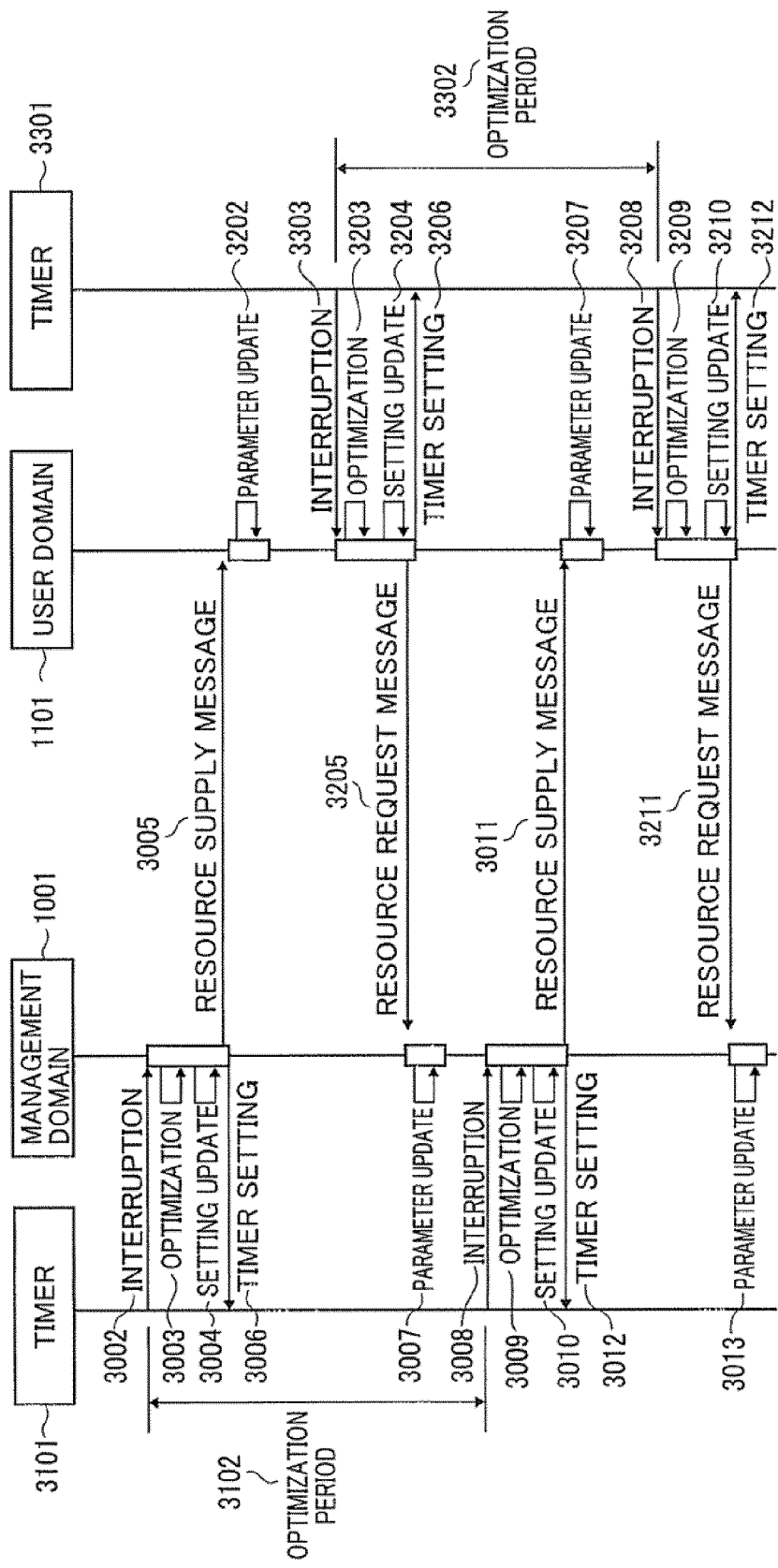
FIG. 3 is a view showing a sequence of optimization processing in the virtual computer system according to the first example of the present invention.

FIG. 3 shows an example of a sequence of the above operation. In the example of FIG. 3, only two domains (management domain 1001 and one user domain 1101) exist, and the two domains locally repeat optimization at a constant period, whereby asymptotical convergence to a globally optimum value for a given state is achieved. For periodic operation, the management domain 1001 and user domain 1101 sets the subsequent operation time in timers 3101 and 3301 every time the processing is ended. The subsequent optimization processing is started with an interruption from the timer taken as a trigger. In the following, the detail of the operation will be described.

An interruption 3002 is input to the management domain 1001 from the timer 3101 as given timing. The management domain 1001 loads the latest parameter information required for the optimization thereinto with the interruption taken as a trigger to thereby perform optimization 3003. The optimization 3003 is to calculate, based on the resource request information from the user domain 1101, optimum resource allocation and resource control parameter setting satisfying the management policy and resource supply information to be transmitted to the user domain 1101. Subsequently, in setting update 3304, the management domain 1001 performs resource allocation and resource control parameter setting according to the calculation results and notifies the user domain 1101 of the resource supply information by a resource supply message 3005. Then, the management domain 1001 makes timer setting 3006 such that the subsequent optimization is started after the current optimization period 3102 has been ended.

With an interruption of the resource supply message 3005 taken as a trigger, the user domain 1101 updates, in parameter update 3202, the resource supply information of the user domain 1101 itself which has been notified from the management domain 1001. If, at this time, the resource allocation set in the user domain 1101 itself has been updated, the user domain 1101 may optimize the resource allocation setting parameters set therein and updates them. Thereafter, upon input of an interruption 3303 from the timer 3301, the user domain 1101 updates the internal state and resource supply information from the management domain 1001 and then performs optimization 3203 to thereby update the optimum internal state, setting parameters, and resource request information. Further, the user domain 1101 notifies the management domain 1001 of the resource request information by a resource request message 3205 and, after that, sets the subsequent optimization time in the timer in timer setting 3206, and ends the operation.

Upon receiving the resource request message 3205, the management domain 1001 updates, in parameter update 3007, the resource request information of the user domain 1101.

Subsequently, the same processing is repeated and, thereby, asymptotical convergence to an optimum setting is achieved. With reference to FIG. 8, an example of the convergence will be described in detail below, taking a case where only one resource (resource A) is present as an example.

The management domain 1001 transmits p as supply information of resource A to the user domain 1101, and the user domain 1101 transmits $\zeta$ as request information of resource A. The supply information and request information are, e.g., cost index typified by price and request amount, respectively and are generally a positive real number but are not limited to this.

It is assumed that a settable range 8005 of the supply information and a settable range 8004 of the request information have previously been defined as a management policy in the management domain 1001 and user domain 1101, respectively. The management domain 1001 always calculates p that maximizes the above utility based on the given internal state $\theta$ and request information $\zeta$ from the user domain 1101 (setting parameter $\alpha$ is omitted here for simplification of the explanation). This can be considered as the optimum reaction of the management domain 1001 with respect to the input from the user domain 1101, and it is assumed that an optimum reaction function 8002 with respect to the given $\zeta$, in which $\theta$ is set as a parameter, is given by the following equation.

$$p = f(\zeta|\theta) \quad (3)$$

Similarly, it is assumed that an optimum reaction function 8003 of the user domain 1101 with respect to the resource supply information p from the management domain 1001, in which the internal state $\lambda$ is set as a parameter, is given by the following equation.

$$\zeta = g(p|\lambda) \quad (4)$$

FIG. 8 visualizes the above two functions 8002 and 8003 with $f$ and p plotted on the horizontal and vertical axes, respectively. For simplification, it is assumed that the internal state $\theta$ of the management domain 1001 and internal state $\lambda$ of the user domain 1101 are fixed. In the case where, for example, the resource request issued from the user domain 1101 at a given time point is $\zeta 0$, the optimum reaction of the management domain 1001 is $p0=f(\zeta 0|\theta)$. In the subsequent optimization, the user domain 1101 outputs $\zeta 1 = g(p0|\lambda)$ as the optimum reaction with respect to this p0. Arrows in FIG. 8 indicate that repetition of the above series of operations allows p and $\zeta$ to be converged to a convergence point 8001 of p* and $\zeta$*. The convergence point 8001 depends on the internal states $\theta$ and $\lambda$, so that it is possible to put the convergence point 8001 in a desired state by controlling the internal states $\theta$ and $\lambda$. This control may previously be calculated, or dynamically be changed by the domains 1101 and 1001 according to the management policy. Further, the global control section 1302 of FIG. 1 may directly change the above control and indirectly change the management policies of the domains 1101 and 1001.

Although the above example is described on a case where a single resource is present, the same is applied to a case where a plurality of resources are present. When, for example, N resources are present, the supply information or resource information is required to the number of resources. In this example, the above information can be represented as an N-dimensional vector, but not limited to this.

In the case where a single resource is presented, the convergence property is determined by the slope of the optimum function thereof. Hereinafter, the convergence property in an N-dimension will be described. Assuming that the supply information and request information are represented by N-dimensional vectors p and $\zeta$, respectively and that the optimum reaction functions of the management domain 1001 and user domain 1101 are $p = f(\zeta)$ and $\zeta = g(p)$ ($\theta$ and $\lambda$ are omitted here), an output pt+1 of the management domain 1001 at time point t+1 is represented as pt+1=f(g(pt))≡h(pt). The output value is updated as pt→pt+1=h(pt)→pt+2=h(pt+1)→ . . . , so that the property of the map h determines the convergence property. In general, it is known that convergence is achieved at only one point when the h is a contraction map, so that by setting the settable range or internal state, it is possible to design the system in which convergence is always achieved.

The same is applied to a case where a plurality of user domains 1101 exist. In general, messages are exchanged, in a mesh topology, among all the domains in the system, and the optimum reaction for an input from another domain is repeated, whereby the entire optimization is realized.

The optimization processing is repeated in the management domain 1001 and user domain 1101 at a constant period but not limited to this. For example, the optimization period may be changed depending on the magnitude of a variation of a state (request from the user domain 1101 or application load factor) or may be made random. In particular, there may be case where when the application load is subjected to periodic temporal variation, the supply information and request information oscillate. This can be prevented by making the optimization period random or performing active control in which the oscillations of the supply information and request information are detected so as to shift the period or value.

In the present example, the user domain 1101 constituting a virtual device performs, based on the resource supply information, application detail information, and the like received from the virtualization section 1202, optimum setting of resource allocation to applications, as well as, transmits optimum resource request information to the virtualization section 1202. The management domain 1001 that controls the virtualization section 1202 performs, based on the resource request information, physical resource operating state, and the like from the user domain 1101, setting of new optimum resource allocation to the user domain 1101, as well as, transmits optimum resource supply information to the user domain 1101. By the local and distributed optimization performed in both the domains 1101 and 1001 and interaction achieved by exchange of the resource supply information and resource request information, active resource allocation is achieved to increase application performance to a desired level with minimum possible power consumption and resources.

EXAMPLE 2

Figure 4:
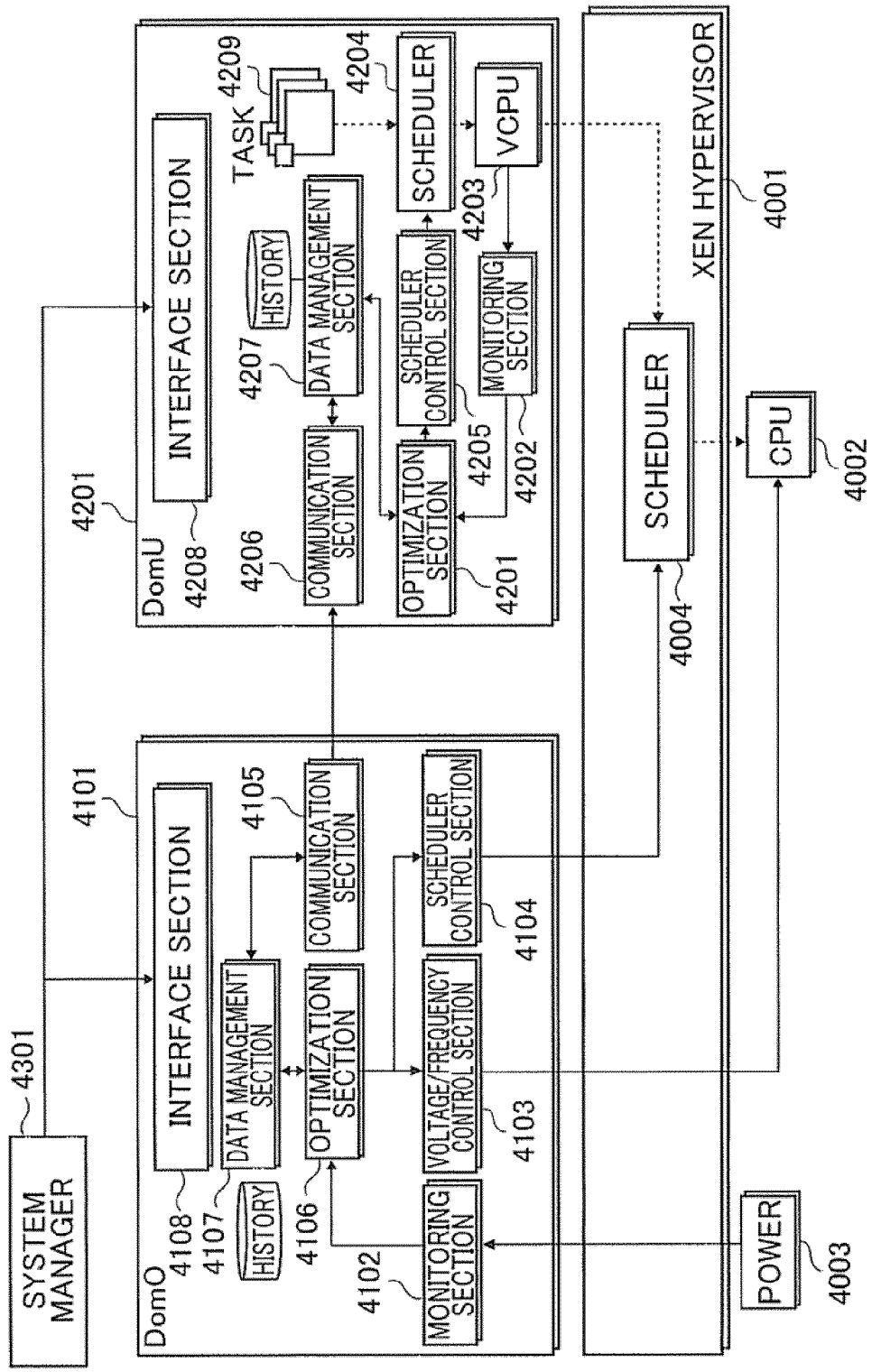
FIG. 4 is a block diagram showing the entire configuration of a virtual computer system according to a second example of the present invention.

An Example 2 of the present invention will be described in detail below with reference to the accompanying drawings. Referring to FIG. 4, the Example 2 of the present invention includes a virtualization section (Xen Hypervisor) 4001, a management domain (Dom0) 4101, a user domain (DomU) 4201, and a system manager 4301.

The virtualization section 4001 manages a virtual machine (domain) and a physical resource. In particular, the virtualization section 4001 manages a CPU 4002 and a power consumption (Power) 4003. The virtualization section 4001 includes a scheduler 4004 that performs scheduling of allocation of a virtual CPU (VCPU) 4203 supplied to each user domain 4201 to the CPU 4002. As the scheduler 4004 in the Xen, a real-time scheduler typified by sedf (Simple Earliest Deadline First) which has a period (cycle) and slice (calculation time) as setting parameters, is adopted but not limited to this.

The power consumption 4003 is determined by the operating frequency and voltage of the CPU 4002. A configuration may be adopted in which a function table of the above values is provided or a power consumption is actually measured.

The user domain 4201 has a plurality of tasks 4209, and the guest OS operating on the domain handles the allocated virtual CPU 4203 as a physical CPU and uses a scheduler 4204 to allocate the CPU resource. The term "task" indicates a unit of scheduled job, such as a process or thread of an application. The type of the scheduler 4204 depends on which scheduler the guest OS adopts. In this example, as in the case of the Xen, a real time scheduler that performs scheduling using period and calculation time but not limited to this. A monitoring section 4202 monitors a scheduling result of the tasks 4209 output to the virtual CPU 4203 and converts the monitored result to QoS, such as processing delay or throughput, that the tasks experience. The QoS depends on the type of the task. For example, in the case of video application, high quality reproduction can be achieved with shorter period and more calculation time; on the other hand, in the case of a user-responsive application such as a shell or word processor, the calculation time is a matter of no importance in most cases, but the period is of importance in some applications.

A scheduler control section 4205 dynamically changes the setting parameters of the scheduler 4204 to thereby change the resource allocation to each task.

A communication section 4206 communicates with a communication section 4105 of the management domain 4101 to thereby transmit the current resource request and receive the resource supply information. This communication is typically established by a TCP connection but not limited to this. Further, the received resource supply information is transferred to a data management section 4207 and is then stored in a storage section as a history.

The data management section 4207 manages data required for optimization. Concretely, the data management section 4207 stores information obtained at each time point, such as resource supply information, internal state, optimization result setting parameters, and resource request information.

An optimization section 4201 acquires, from the data management section 4207 and monitoring section 4202, information of the internal state (task configuration information typified by priority, management policy information indicating resource upper limit and the like, task QoS state monitored by the monitoring section 4202, etc.), current setting information (scheduler parameter setting information to the task), resource supply information, and the like and calculates an optimum setting and resource request information. A calculation result of the optimum setting is reflected in the scheduler setting through the scheduler control section 4205. Further, calculation results of the optimum setting and resource request information are transferred to the data management section 4207 and are stored therein as a history, and the resource request information is transmitted to the Dom0 using the communication section 4206.

Upon receiving the resource request information, the communication section 4105 of the management domain 4101 transfers the received resource request information to a data management section 4107, and the data management section 4107 stores the resource request information in a storage section as a history.

A monitoring section 4102 monitors the power consumption and constantly notifies an optimization section 4106 of the monitoring result. The optimization section 4106 performs optimization based on the information of power consumption and information required for optimization of the user domain 4201 which is stored in the data management section 4107 and calculates the voltage and frequency setting of the CPU 4002, parameter setting of the scheduler 4004, and resource supply information. Calculation results of the voltage and frequency setting are reflected in the CPU 4002 through a voltage/frequency control section 4103, and the scheduler setting is reflected in the scheduler 4004 through a scheduler control section 4104. In the case of Xen, the above operation is performed through an interface called Hypercall but not limited to this. Further, the resource supply information is stored in the data management section 4107 and is then transmitted to the user domain 4201 by the communication section 4105.

Although the above example is described on a case where only one user domain 4201 is provided, a plurality of user domains 4201 are generally provided in the system. In this case, parameter setting or transmission of the resource supply information is performed for each user domain 4201.

The system manager 4301 can access the user domain 4201 and management domain 4101 through interfaces 4108 and 4208 to thereby dynamically correct internal state information used for acquisition of internal information typified by the current state information or utility value retained/managed in the data management sections 4107 and 4207 or optimization.

Next, resources concerning the CPU 4003 that exchanges supply/request information between the management domain 4101 and user domain 4201 will be described in detail using FIG. 5. The following description is merely an example and does not limit the scope of the present invention.

In real-time scheduling, there roughly exist resources called "period" and "calculation time". How much these resources are allocated at which cost becomes a major focus. In general, the shorter the period and the longer the calculation time, the better the performance becomes. However, when the period is made shorter, the frequency of changeover of the allocation to the user domain 4201 is correspondingly increased, resulting in an increase of overhead. As a default setting, lower limit C0 5001 of the calculation time and upper limit ρ0 5002 are provided so as to set a minimum allocation standard.

Assume that the calculation time and period actually allocated are C 5003 and ρ 5004.
When variable conversion is made such that:

$$x1 = \rho 0 - \rho$$

$$x2 = C - C0,$$

the following inequalities are satisfied:

$$0 \leq x1 \leq \rho 0 - C0$$

$$0 \leq x2 \leq \rho 0 - x1 - C0$$

Thus, definition can be made such that the utility is also increased with increases of x1 and x2. Hereinafter, the x1 and x2 are handled as resources. In the case where three or more resources are present, the number of components is extended such that x=(x1, ..., xn). That is, the resources can be treated as an n-dimensional vector.

Optimization processing in the management domain 4101 and user domain 4201 with respect to the resource vector $x=(x1, x2)$ will be described concretely.

The management domain 4101 performs utility maximization of the setting parameter $\alpha$ and supply information pd based on the resource request information $\zeta$d and internal state $\theta$ from each user domain 4201, i.e., DomU[d] (d=1, 2, ..., D). First, it is assumed that the supply information pd is the cost (price vector) with respect to resources $x=(x1, x2)$ per unit amount, and it is assumed that the resource request information $f$d is request amount from DomU[d] with respect to the price vector that has been presented in the last time, that is, resource demand. In order to allocate more resources to the DomU which has requested maximum possible resources with minimum possible overhead and resource amount, an object of the optimization performed in the management domain 4101 is to balance between the demand amount and cost involved in resource amount/overhead required for the demand. To achieve this, the utility function is defined as follows.

$$u = \Sigma_{d \in D}(x d^T p d - x d^T w) \quad (5)$$

In the above equation, a superscript T of xT indicates a transposed vector, w indicates a cost vector, and D={1, ... D} indicates a domain index set (it is assumed that D DomUs exist). This equation represents that cost is incurred linearly as overhead every time the period is made shorter, for example. The term of the overhead is represented as a linear function in this example but not limited to this.

pd = $\phi$d(xd |hd) is an inverse function of the demand function of DomU[d], and a functional system is determined depending on history information hd indicating what type of request $\zeta$d for price the DomU[d] has issued. Further, xdTdp represents a profit obtained by supplying the DomU[d] with the resources and, in general, the larger the request amount for the same price, the larger the value of pd=$\phi$d(xd |hd) becomes. Thus, from a quantitative point of view, in order to optimize the utility, more resources are allocated to a user domain 4201 that has issued a request of a larger amount.

A condition of the settable range must be that the period and slice to be allocated are not more than the upper limit period $\rho$0 and not less than the lower limit time C0, respectively, and must be a range that can be scheduled. Therefore, a settable range X determined by the following constraint condition:

$$0 \leq x1 \leq \rho 0 - C0$$

$$0 \leq x2 \leq \rho 0 - x1 - C0$$

$$\min\{fd | fd \in F, \Sigma_{d \in D}[f\max(C0+xd2)/fd(\rho 0-xd1)] \leq 1\}$$

is imposed on the utility maximization. The last constraint expression represents scalability, in which fd is frequency set in domain d, fmax is maximum frequency, and F is frequency settable range. That is, xd=(xd1, xd2)$\in$X that satisfies schedulability with minimum possible frequency within the allowable frequency setting range is required.

In the actual optimization, the form of pd=$\phi$d(xd|hd) must be determined. Since the management domain 4101 does not know this functional system in general, it estimates the functional system based on a presented price and history of requests for the price. For example, approximation can be made according to a multiple regression analysis using a linear function that minimizes the square sum of error, but not limited to this. Alternatively, a method may be employed in which a functional system to be used between the user domain 4201 and management domain 4101 is previously determined and the coefficient information of the determined functional system is exchanged therebetween, in place of a method in which the resource request information $\zeta$t d is optimized with respect to the presented price to obtain the resource request amount as a result. The multiple regression analysis is a function corresponding to the demand estimation section 1004 described in the first example, and the function of the multiple regression analysis is included in the optimization section 4106 in the present example.

Assuming that the multiple regression analysis is used to estimate pd={Hd(hd)xd}/2+bd(hd) ... (6), the utility function is a concave function with respect to xd, and the settable area X determined by the constraint condition is a convex set, so that an optimum point necessarily exists. When optimum allocation {xd*} is determined, a set price vector pd which is the supply information is also determined based on pd=$\phi$d (xd|hd). The management domain 4101 converts [xd*] into a scheduler setting parameter of each target user domain 4201 and notifies each DomU[d] of pd (and xd).

The user domain 4201 calculates the current resource acquisition cost based on the resource supply information p and calculates a resource request $\zeta$ that maximizes the utility determined by the task QoS in a range that does not exceed a resource acquisition enable range $\Xi$ (hereinafter, d of the number of DomU is omitted).

The utility can be defined by the sum of the values obtained by multiplying Qi (ri, Li) which is the QoS of each task i by a weight $\delta$i such that $$u = \Sigma_{i \in T} \delta i Q i(r i, L i) \quad (7)$$

where, $$\Sigma_{i \in T} \delta i = 1$$

but not limited to this. T={1, ..., T} is a task index set. $\delta$i is information that each user domain 4201 retains as the static internal state determined at the start-up time by the configuration and is determined by the priority of the tasks. Qi(ri, Li) is a function between ri={ri1, ri2} (resource vector allocated to task i) and Li (current load (e.g., processing number) of task i).

The resource acquisition enable range $\Xi$ is defined as follows:

$$0 \leq ri1 \leq \zeta 1$$

$$0 \leq ri2$$

$$\Sigma_{i \in T} ri2 = \zeta 2 \leq \rho 0 - C0 - \zeta 1$$

$$p1\zeta 1 + p2\zeta 2 \leq B$$

Since ri1 is a period allocated to task i, $\zeta$1 that the user domain 4201 issues to the management domain 4101 as the resource request must be the maximum value of all the tasks. Further, as to ri2, the sum thereof represents required calculation time, which is the resource request $\zeta$2. In order to reflect the priority of the user domains 4201, budget B is given to the constraint expression so as to provide the upper limit of the resource acquisition cost. If the guest OS adopts an edf scheduler, a constraint expression $$\Sigma_{i \in T}[(C0+ri2)/(\rho 0-ri1)] \leq 1$$

is added.

In the resource acquisition enable range $\Xi$, the user domain 4201 calculates a resource allocation {ri}i$\in$T and calculates a resource request $\zeta$ based on the obtained resource allocation. (B, $\rho$0, C0) is statically given, and Li and p dynamically change. In particular, p depends on which type of a request another user domain 4201 has issued and, when the request amount of one user domain 4201 is larger than that of another, the more resources are allocated to the one user domain 4201. Further, in general, p increases with an increase in the request ζ and decreases with a decrease in the request ζ.

There are a variety of forms of Qi(ri,Li) that determines QoS. In general, from an intuitive point of view, a monotonically decreasing function is defined with respect to Li and a monotonically increasing function is defined with respect to ri. Since the settable area Ξ is a convex set, if the form of Qi(ri, Li) is a concave function within Ξ, an optimum point necessarily exists.

FIG. 6 shows a state where the management domain (Dom0) 4101 and user domain (DomU) 4201 exchange the resource supply/request information between them while performing the optimization. Contour lines 6001 and 6101 of the utility determined by the above utility function are provided for the cases of the management domain 4101 and user domain 4201, and the management domain 4101 and user domain 4201 search for the maximum point within settable areas 6002 and 6102. Based on the resultant optimum settings, the management domain 4101 transmits the resource supply information to the user domain 4201 while the user domain 4201 transmits the resource request information to the management domain 4101, whereby the optimum points of the respective domains can actively be searched. A variation of an application in each user domain 4201 is transmitted through the above message exchange. Thus, if the optimization can be performed according to a virtualization architecture without reference to the details of the user domains 4201 and the abovementioned convergence condition is satisfied, autonomous approach to the globally optimum point can be achieved.

EXAMPLE 3

Example 3 of the present invention will be described in detail with reference to FIG. 7.

Referring to FIG. 7, a virtual computer system according to the present example performs optimum application of an I/O device 7003 to a virtual I/O device (VI/O) 7102 of a first user domain (DomU[1]) and a virtual I/O device (VI/O) 7202 of a second user domain (DomU[2]) in an I/O virtualization architecture typified by Xen and includes a management domain (Dom0) 7001 and first and second user domains 7101 and 7201. The number of the user domains can be two or more.

An I/O virtualization system typified by Xen realizes sharing and protection of an I/O device by allowing a privileged domain permitted to access the device to mediate I/O access of each user domain. In the example of FIG. 7, the management domain (Dom0) serves as the privileged domain, manages the I/O device 7003 and is only one domain that can directly access the I/O device. The first and second user domains 7101 and 7201 serve as the user domains. The management domain 7001 includes a native driver 7004 that accesses the I/O device 7003 and a backend driver 7005 that performs transfer of information from the user domain. The first user domain 7101 includes a frontend driver 7103 connected to the backend driver 7005 through a data transfer channel. The guest OS of the first user domain 7101 uses the frontend driver 7103 to process an access request of a task to the virtual I/O device 7102. The frontend driver 7103 transfers the processing to the backend driver through a data transfer channel, and the backend driver 7005 transfers the processing to the native driver 7004, whereby the I/O access is achieved.

The same is applied to the first user domain 7201. That is, the backend driver 7005 proxies the processing of each user domain to thereby realize the virtualization of the I/O device. The backend driver 7005 has inside thereof a queue management section 7006, which temporarily stores I/O accesses from a plurality of user domains in a queue and controls the queue to thereby control resource allocation (throughput, etc.) of the I/O device.

A management domain agent (Dom0_Agent) 7007 is a software program having a function of managing the management domain (Dom0) described in the first or second example and including, e.g., the physical resource monitoring section, optimization section, data processing section, history, message processing section, resource control section, interface, and the like described in the first example. Similarly, a first user domain agent (DomU[1]_Agent) 7106 and a second user domain agent (DomU[2]_Agent) 7206 each have a function of managing the user domain (Dom[U]) described in the first or second example and including, e.g., the resource control section, message processing section, optimization section, application performance monitoring section, interface, data processing section, history, and the like described in the first example.

The management domain agent 7007 exchanges, with the first and second user domain agents 7106 and 7206, the resource supply information and resource request information and calculates resource allocation (parameter setting value for resource setting), resource supply, or request information that maximizes the utility of each user domain. In this example, the resource to be allocated is the I/O device and, concretely, the processing throughput or processing delay thereof, but not limited to this. The management domain agent 7007 monitors a power 7002 and processing output from a queue to monitor actual allocation to the user domain and performance and reflects optimized results of information of the internal state, resource request information from the user domain through a queue management section 7006, and notifies the user domain of the resource supply information.

The first user domain 7101 transfers a processing request from a task 7104 to a virtual I/O device 7102 to a queue management section 7105, in place of processing the processing request by directly accessing the frontend driver 7103, to perform allocation of resources typified by processing throughput (the same operation is performed in the second user domain 7201, and the descriptions of the operation of the second user domain 7201 will be omitted). The first user domain agent 7106 can change the resource allocation by controlling the setting of the queue management section 7105. The first user domain agent 7106 monitors the actual processing state of the task 7104 to acquire performance information and uses the same method as that employed in the second example to calculate the setting value of the queue management section 7105 and resource request information so as to maximize the utility of the first user domain 7101. By performing the above processing in each domain according to the same processing flow as that employed in the first or second example, design of the entire system can be made such that approach to the globally optimum setting can be achieved. Further, by connecting the system manager 4301 described in the second example to the management domain agent 7007, first user domain agent 7106, and second user domain agent 7206, it is possible to dynamically change the setting or dynamically monitor the state.

It is possible to virtualize both a CPU resource and I/O device by combining configurations of the second and third examples.

Although a virtualization method typified by Xen has been described in the present example, basically the same processing can be performed in virtualization methods other than Xen, and the present example is not limited to a specific virtualization method.

Although the present invention has been described in detail with reference to the above exemplary embodiments and examples, it should be understood that the present invention is not limited to the above exemplary embodiments and examples. Various changes that those skilled in the art can understand can be made to the configuration and details of the present invention without departing from the sprit and scope of the invention.

This application is the National Phase of PCT/JP2008/055914, filed Mar. 27, 2008, which is based upon and claims the benefit of priority from prior Japanese Patent Application No. 2007-105762, filed Apr. 13, 2007, the entire contents of which are incorporated herein.

Industrial Applicability

The present invention can be applied to design and management of an IT/NW (information technology/network) system that uses a virtualized computer system to perform fair resource allocation with high resource use efficiency.

The invention claimed is:

1. A virtual computer system, which includes at least one physical resource, comprising:
    a plurality of virtual devices that share the physical resources of a computer and execute an application;
    a virtualization section that manages the plurality of virtual devices; and
    a management section that controls the virtualization section, wherein,
    the plurality of virtual devices set allocation of the physical resources to the applications by a first optimization calculation using resource supply information from the management section and transmit resource request information corresponding to the resource allocation setting to the management section,
    the management section sets allocation of the physical resources to the virtual devices by a second optimization calculation using the resource request information from the plurality of virtual devices and transmits the resource supply information corresponding to the resource allocation setting to the plurality of virtual devices,
    the first and second optimization calculations are performed while the resource supply information and the resource request information are exchanged repeatedly between the plurality of virtual devices and the management section to dynamically allocate the physical resources such that results of both the first and second optimization calculations are converged in a predetermined range,
    the first optimization calculation is exerted influence by a result of the second optimization calculation, and
    the second optimization calculation is exerted influence by a result of the first optimization calculation.

2. The virtual computer system according to claim 1, wherein
    the virtualization section is a virtual machine monitor, and
    the plurality of virtual devices each include virtual resources provided by allocation of the physical resources performed in a time-division multiplex fashion and an operating system and application program running on the virtual resources.

3. The virtual computer system according to claim 1, wherein
    the physical resources include at least one of a CPU and I/O device, and
    the plurality of virtual devices share the physical resources in a time-division multiplex fashion.

4. The virtual computer system according to claim 1, wherein
    the application is a software program that runs on a computer, and
    the performance of the application depends on the resource amount of physical resources supplied by the virtualization section and the type of the resources.

5. The virtual computer system according to claim 1, wherein the management section executes a privileged command including control for setting the physical resources and control for allocating the resources to the virtual devices.

6. The virtual computer system according to claim 1, wherein
    the first optimization calculation uses detailed information of an application, and
    the detailed information of the application is performance information including at least one of a management policy including load, allocated resource amount, and priority, processing delay and processing throughput.

7. The virtual computer system according to claim 1, wherein the plurality of virtual devices each manage detailed information of the application program therein and instruct an operating system running thereon to control allocation of the resources to the application program.

8. The virtual computer system according to claim 1, wherein the resource supply information is information concerning use cost and allocation amount of the resources that the virtualization section allocates to each of the virtual devices.

9. The virtual computer system according to claim 1, wherein
    the first optimization calculation uses previously set first management policy information, and
    the first management policy information is an index indicating the priority of the application and resource acquisition upper limit depending on the priority.

10. The virtual computer system according to claim 1, wherein
    the second optimization calculation uses previously set second management policy information, and
    the second management policy information is information including at least one of the priority of the virtual devices, information concerning the resource use cost, and a settable range including the upper and lower limits of the resource allocation amount.

11. The virtual computer system according to claim 1, wherein setting of resource allocation to the application is performed by an operating system running on each of the virtual devices performing scheduling of resource use allocation of the virtual resources with respect to a process and a thread associated with each application program.

12. The virtual computer system according to claim 1, wherein the resource request information is request information concerning the allocation amount of the virtual resources determined based on the optimum resource amount.

13. The virtual computer system according to claim 1, wherein
    the second optimization calculation uses operating state information of the physical resources, and
    the operating state information of the physical resources is information describing the operating state of the physical resources including at least one of the current setting information of the physical resources, a control parameter value of a program that controls the physical resources, and a power consumption.

14. The virtual computer system according to claim 1, wherein
the second optimization calculation uses a history of information concerning resource allocation to the virtual devices, and
the information concerning resource allocation to the virtual devices is histories of resource allocations that have been performed up to the current time point based on the result of the optimization and resource request information from the plurality of virtual devices corresponding to the resource allocation.

15. The virtual computer system according to claim 1, wherein
the second optimization calculation uses previously set second management policy information, and
the second management policy information is statically set information concerning optimization and resource allocation, which includes a cost index with respect to a use of the physical resources, priority of the virtual devices, and a settable range indicating the upper and lower limits of the resources to be allocated to the virtual devices.

16. The virtual computer system according to claim 1, wherein the dynamic allocation of the physical resource is performed so that desired application performance is achieved with a low power consumption by control of setting parameters of the physical resources.

17. The virtual computer system according to claim 1, wherein the first and second optimization calculations are periodically performed or autonomously performed upon reception of an instruction from an external program or depending on an analysis result of the current management information which constantly changes.

18. The virtual computer system according to claim 1, wherein
the physical resources include a CPU, and
in the case where the virtualization section adopts real-time scheduling, the allocation of the physical resources is performed by changing the period and calculation time of the CPU which are to be allocated to the plurality of virtual devices.

19. The virtual computer system according to claim 1, wherein
the physical resources include an I/O device, and
the allocation of the physical resources is performed by queuing the processing of the I/O device from the plurality of virtual devices and managing the queue.

20. The virtual computer system according to claim 1, wherein the second optimization calculation maximizes a quantitative utility function defined by a gain corresponding to the degree of resource request made based on the resource request information and cost involved in the resource allocation and performs setting of resource allocation to the virtual devices within a settable range which is determined based on previously set management policy information.

21. The virtual computer system according to claim 1, wherein the first optimization calculation performs setting of resource allocation to the application so as to maximize a quantitative utility function determined by performance information of the application within a settable range which is determined based on previously set management policy information.

22. The virtual computer system according to claim 1, wherein the resource supply information indicates resource use cost and resource allocation amount.

23. The virtual computer system according to claim 1, wherein the first and second optimization calculations are performed while the resource supply information and the resource request information are exchanged between the plurality of virtual devices and the management section to converge results of both the first and second optimization calculations on a globally optimum point.

24. The virtual computer system according to claim 1, wherein:
the plurality of virtual devices respectively include a first optimization section which calculates the first optimization, corresponding to the resource request information, by using the resource supply information; and
the management section includes a second optimization section which calculates the second optimization, corresponding to the resource supply information, by using the resource request information.

25. A method for optimizing a virtual computer system comprising a plurality of virtual devices that share the physical resources of a computer and execute an application and a virtualization section that manages the plurality of virtual devices, wherein
the plurality of virtual devices set allocation of the physical resources to the applications by a first optimization calculation using resource supply information from a management section that controls the virtualization section and transmit resource request information corresponding to the resource allocation setting to the management section,
the management section sets allocation of the physical resources to the virtual devices by a second optimization calculation using the resource request information from the plurality of virtual devices and transmits the resource supply information corresponding to the resource allocation setting to the plurality of virtual devices,
the first and second optimization calculations are performed while the resource supply information and the resource request information are exchanged repeatedly between the plurality of virtual devices and the management section to dynamically allocate the physical resources such that results of both the first and second optimization calculations are converged in a predetermined range,
the first optimization calculation is exerted influence by a result of the second optimization calculation, and
the second optimization calculation is exerted influence by a result of the first optimization calculation.

26. A non-transitory computer-readable recording medium that stores an optimization program for a virtual computer system comprising a plurality of virtual devices that share the physical resources of a computer and execute an application and a virtualization section that manages the plurality of virtual devices, the program allowing a computer to execute:
a step in which the plurality of virtual devices set allocation of the physical resources to the applications by a first optimization calculation using resource supply information from a management section that controls the virtualization section and transmit resource request information corresponding to the resource allocation setting to the management section,
a step in which the management section sets allocation of the physical resources to the virtual devices by a second optimization calculation using the resource request information from the plurality of virtual devices and transmits the resource supply information corresponding to the resource allocation setting to the plurality of virtual devices, a step in which the first and second optimization calculations are performed while the resource supply information and the resource request information are exchanged repeatedly between the plurality of virtual devices and the management section to dynamically allocate the physical resources such that results of both the first and second optimization calculations are converged in a predetermined range, the first optimization calculation is exerted influence by a result of the second optimization calculation, and the second optimization calculation is exerted influence by a result of the first optimization calculation.

* * * * *